United States Patent [19]
Scott

[11] 3,846,648
[45] Nov. 5, 1974

[54] SOLID-STATE TIMER SWITCH PROVIDING AC POWER TO A LOAD FOR A PREDETERMINED TIME AFTER A MAIN SOURCE OF POWER IS REMOVED

[75] Inventor: Charles E. Scott, Indianapolis, Ind.

[73] Assignee: P. R. Mallory & Co., Inc., Indianapolis, Ind.

[22] Filed: June 18, 1973

[21] Appl. No.: 370,958

[52] U.S. Cl. .......... 307/293, 307/252 B, 307/252 N
[51] Int. Cl. .......... H03k 17/26
[58] Field of Search .......... 307/293, 252 N, 252 B; 328/129, 130

[56] References Cited

UNITED STATES PATENTS

| | | | |
|---|---|---|---|
| 3,045,150 | 7/1962 | Mann | 307/293 |
| 3,060,350 | 10/1962 | Rywak | 307/293 |
| 3,182,228 | 5/1965 | Gambill et al. | 307/293 |
| 3,189,751 | 6/1965 | Winchel | 307/293 |
| 3,559,072 | 1/1971 | Davisson | 307/293 |
| 3,745,382 | 7/1973 | Hoge et al. | 307/293 |

*Primary Examiner*—Stanley D. Miller, Jr.
*Attorney, Agent, or Firm*—Charles W. Hoffman; Robert F. Meyer

[57] ABSTRACT

A timing circuit utilizing a solid-state switching device, which may be a silicon-controlled rectifier, a transistor, or a triac, provides power to a load for a predetermined period of time.

8 Claims, 3 Drawing Figures

SOLID-STATE TIMER SWITCH PROVIDING AC POWER TO A LOAD FOR A PREDETERMINED TIME AFTER A MAIN SOURCE OF POWER IS REMOVED

Generally speaking the present invention relates to a solid-state timer switch wherein a load is provided with power through a semi-conductor switching device for a predetermined period of time. More specifically the present invention relates to a solid-state timer switch circuit wherein: a power terminal means comprising first and second terminals connects a power supply to the circuit; a capacitance means is connected one side to a common side of the circuit; a first resistance means is connected one side to the second side of the capacitance means; a diode is connected cathode to the second side of the first resistance means; a semi-conductor switching device is connected to the common side of the circuit; a second resistance means is connected one side to the semi-conductor switching device and the other side to the junction of the first resistance means and the capacitance means; a third resistance means is connected one side to the common side of the circuit and the other side to the semi-conductor switching device; a load is connected common side to the semi-conductor switching device; and a switching means is connected to the second side of the load, to the second terminal, and to the anode of the diode.

One application of a device like this is to provide power to a load for a predetermined period of time, at the end of which, the power is terminated. For example, this invention can be employed in a microwave oven to indicate an end of cooking cycle. In this case the load is a buzzer, or some other audible alarm, that sounds for a predetermined period of time to alert the operator that the cooking is finished.

The power supply for this circuit can be alternating or direct current with no modifications to the circuit being necessary. If AC is used, a diode is provided for rectifying the current, and if DC is used the same diode acts as a DC block insuring correct discharge of a capacitor.

Accordingly, a feature of the present invention is to provide a solid-state timer switch circuit utilizing a solid-state switching device such as a silicon-controlled rectifier, a transistor, or a triac to supply power to a load for a predetermined period of time. Another feature of the invention is to provide a solid-state timer switch circuit utilizing a solid-state switching device to supply power to an audible alarm in a microwave oven for a predetermined period of time. Another feature of the present invention is to provide a solid-state timer switch circuit operating from either a direct current source or an alternating current source. Another feature of the present invention is to provide a solid-state timer switch circuit wherein a time base is established by a combination of resistors and a capacitor. Another feature of the present invention is to provide a solid-state timer switch circuit utilizing a small number of inexpensive components in simple combination. These and other features will become apparent from the following description taken in conjunction with the accompanying drawings wherein:

Figure 1:
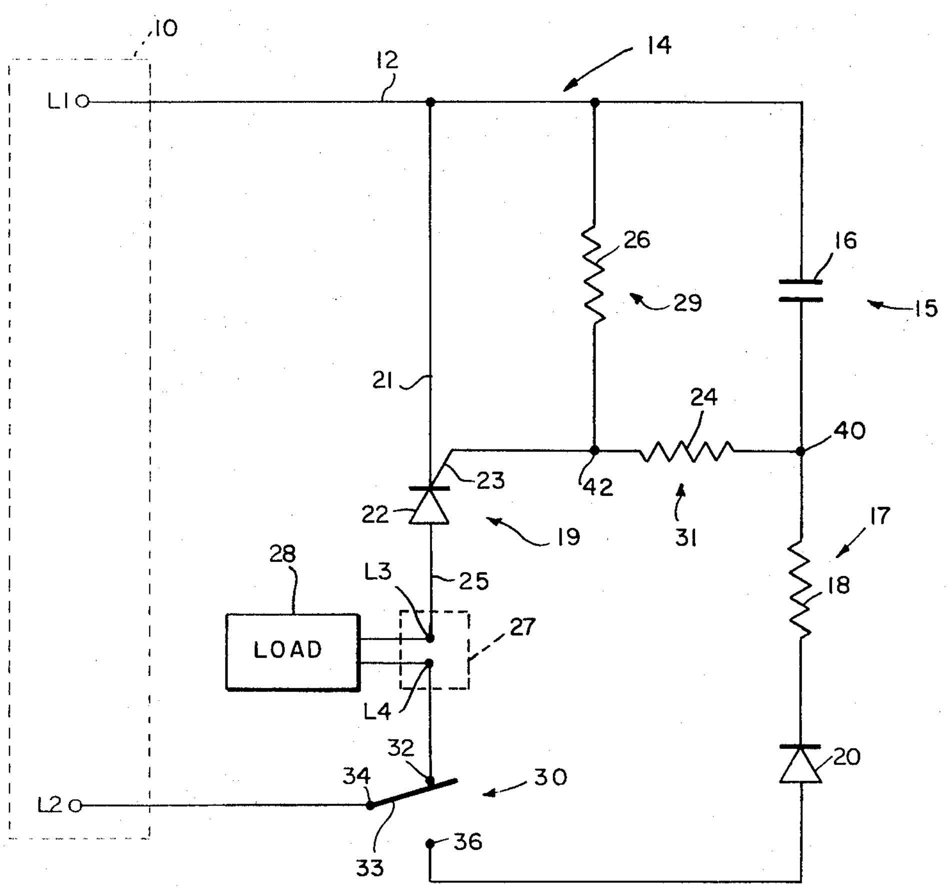
FIG. 1 is an embodiment of the present invention wherein the solid-state switching device is a silicon-controlled rectifier.

Referring now to FIG. 1, a power terminal means 10, comprising a first and second terminal L1 and L2, connects a power supply to a solid-state timer switch circuit 14. Terminal L1 connects to common side 12 of circuit 14. A capacitance means 15, comprising capacitor 16, is connected one side to the common side 12 of the circuit. A first resistance means 17, comprising resistor 18, is connected one side to the other side of capacitor 16. A diode 20 is connected cathode to the other side of resistor 18. A solidstate switching means 19 comprises a silicon-controlled rectifier (SCR) 22 in the embodiment illustrated in FIG. 1. SCR 22 is connected cathode 21 to the common side 12 of circuit 14. A second resistance means 31, comprising resistor 24, is connected one side to the gate 23 of SCR 22 and the other side to a junction 40 between capacitor 16 and resistor 18. A third resistance means 29, comprising resistor 26, is connected one end to the common side 12 of the circuit and the other end to the gate 23 of SCR 22 and to a junction 42.

A load-connecting means 27 comprises two terminals L3 and L4. A load 28, such as a buzzer, is connected to terminals L3 and L4. The anode 25 of SCR 22 is connected to terminal L3. A switching means 30 comprising a single-pole double-throw (SPDT) switch 33, includes normally closed pole 32, a common pole 34, and a normally open pole 36. Normally closed pole 32 is connected to terminal L4. Common pole 34 is connected to second terminal L2. Normally open pole 36 is connected to the anode of diode 20.

Figure 2:
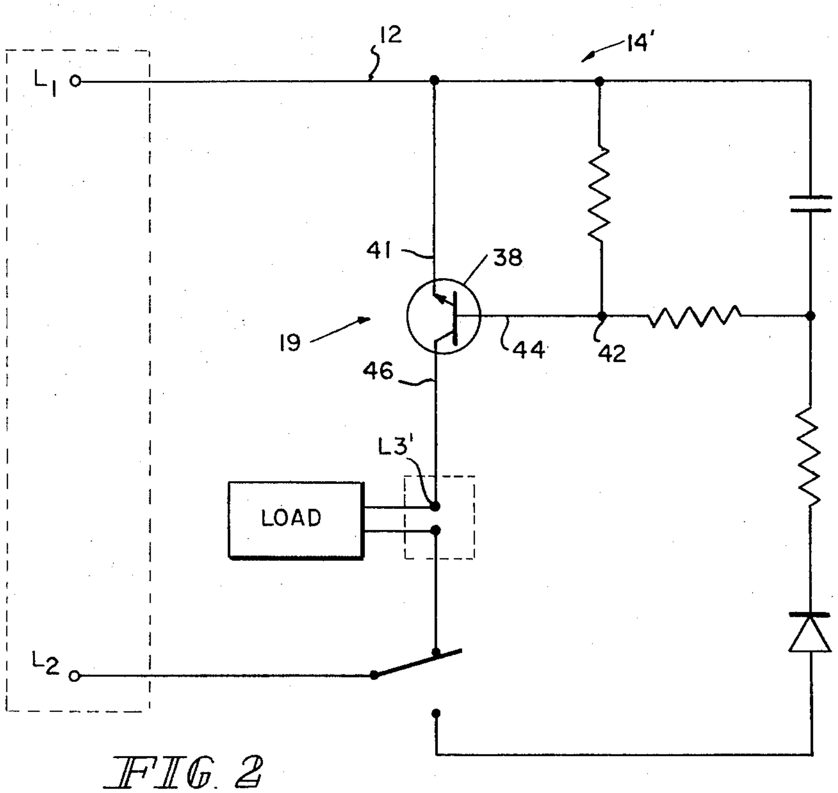
FIG. 2 is an embodiment of the present invention wherein the solid-state switching device is a transistor.

Another embodiment of the present invention, illustrated in FIG. 2, utilizes a transistor 38 for solid-state switching means 19. In this embodiment, the base 44 of transistor 38 is connected to common junction 42, the collector 46 is connected to terminal L3, and the emitter 41 is connected to first side 12 of circuit 14'. The rest of the circuit is identical to the circuit shown in FIG. 1.

Figure 3:
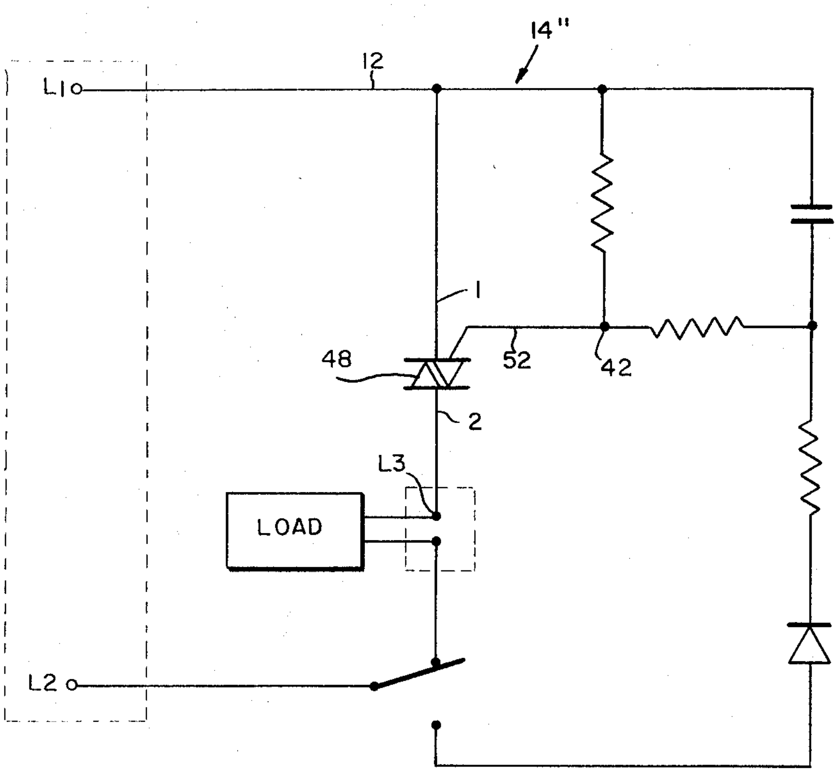
FIG. 3 is an embodiment of the present invention wherein the solid-state switching device is a triac.

A third embodiment of the present invention, illustrated in FIG. 3, utilizes a triac 48 for solid-state switching means 19. In this embodiment, the gate 52 of triac 48 is connected to common junction 42, main terminal 1 is connected to the first side 12 of circuit 14'', and main terminal 2 is connected to terminal L3''. The rest of circuit 14'' is identical to each of circuits 14 and 14' shown in FIGS. 1 and 2.

In operation of the embodiment utilizing SCR 22 as shown in FIG. 1, power is applied to terminals L1 and L2. In its closed position SPDT switch 33 applies power from terminal L2 through common pole 34 and normally closed pole 32 to one side of load 28. In the closed position of SPDT switch 33, no voltage appears at gate 23 of SCR 22. Therefore, SCR 22 is off and allows no power to the other side of load 28. Upon switching common pole 34 of SPDT switch 33 to normally open pole 36, power is applied to diode 20.

In the case that the power supplied is AC, diode 20 rectifies the AC and causes capacitor 16 to charge. The voltage across capacitor 16 is limited by resistors 18, 24, and 26. The voltage built up across capacitor 16 biases gate 23 of SCR 22, and SCR 22 turns on providing power from terminal L1 to one side of the load. However, SPDT switch 33 being in its normally open state, allows no power to the load from terminal L2.

In the case that the power applied to terminals L1 and L2 is DC, diode 20 serves as a DC block to keep capacitor 16 from discharging through any path except the gate 23 of SCR 22 and resistors 24 and 26.

Upon the return of common pole 34 of SPDT switch 33 to a normally closed state, power from terminal L2 is reapplied to the load. Capacitor 16, being charged, keeps SCR 22 biased on, (or in the embodiments of FIGS. 2 and 3, transistor 38 or triac 48) so the load also receives power from terminal L1. Therefore, the load turns on and stays on until capacitor 16 is discharged through resistors 24 and 26 and voltage no longer appears at the gate 23 of SCR 22.

What is claimed is:

1. A solid-state timer switch circuit comprising:

a. a power terminal means comprising first and second terminals for connecting said circuit to an alternating current electrical power source, said first terminal connected to a common side of said circuit;

b. a capacitance means connected one side to said common side of said circuit;

c. a first resistance means connected one side to the second side of said capacitance means;

d. a diode connected cathode to the other side of said first resistance means;

e. a solid-state switching means having terminals one of which is connected to said common side of said circuit;

f. a second resistance means connected one side to another terminal of said solid-state switching means and another side to a junction of said first resistance means and said capacitance means;

g. a third resistance means connected one side to said common side of said circuit and another side to said solid-state switching means;

h. a load connecting means including third and fourth terminals, said third terminal connected to said solid-state switching means; and i. a single-pole double-throw switch, a normally closed pole of which is connected to said fourth terminal, a common pole of which is connected to said second terminal and a normally open pole of which is connected to an anode of said diode.

2. The solid-state timer switch circuit according to claim 1 wherein said solid-state switching means is a silicon-controlled rectifier connected anode to said third terminal, cathode to said common side of said circuit, and gate to a common junction of said first and second resistance means.

3. The solid-state timer switch circuit according to claim 1 wherein said solid-state switching means is a transistor connected collector to said third terminal, emitter to said common side of said circuit, and base to a common junction of said first and second resistance means.

4. The solid-state timer switch circuit according to claim 1 wherein said solid-state switching circuit means is a triac connected main terminal 2 to said third terminal, main terminal 1 to said second side of said circuit, and gate to a common junction of said first and second resistance means.

5. The solid-state timer switch circuit according to claim 1 wherein said capacitance means comprises a capacitor.

6. The solid-state timer switch circuit according to claim 1 wherein said first, second, and third resistance means each comprises a resistor.

7. The solid-state timer switch circuit according to claim 1 wherein a load is connected to said load connecting means.

8. The solid-state timer switch circuit according to claim 7 wherein said load is a buzzer.

* * * * *